United States Patent
Giorgi et al.

(10) Patent No.: US 10,505,661 B2
(45) Date of Patent: Dec. 10, 2019

(54) METHODS AND APPARATUS FOR MULTIPLEXING SIGNALS

(71) Applicant: Telefonaktiebolaget LM Ericsson (publ), Stockholm (SE)

(72) Inventors: Luca Giorgi, Pisa (IT); Filippo Ponzini, Pisa (IT)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/072,305

(22) PCT Filed: Jan. 25, 2016

(86) PCT No.: PCT/EP2016/051436
§ 371 (c)(1),
(2) Date: Jul. 24, 2018

(87) PCT Pub. No.: WO2017/129220
PCT Pub. Date: Aug. 3, 2017

(65) Prior Publication Data
US 2019/0036637 A1    Jan. 31, 2019

(51) Int. Cl.
*H04B 10/50* (2013.01)
*H04J 14/02* (2006.01)
*H04B 10/2575* (2013.01)

(52) U.S. Cl.
CPC .... *H04J 14/0298* (2013.01); *H04B 10/25752* (2013.01); *H04B 10/50* (2013.01); *H04B 10/505* (2013.01)

(58) Field of Classification Search
CPC ........... H04J 14/0298; H04B 10/25752; H04B 10/50; H04B 10/505

(Continued)

(56) References Cited

U.S. PATENT DOCUMENTS 4,061,577 A * 12/1977 Bell ...................... G02B 6/3847
398/76
5,311,543 A * 5/1994 Schreiber ............... H04B 1/707
375/141

(Continued)

FOREIGN PATENT DOCUMENTS

WO    2016173616 A1    11/2016

OTHER PUBLICATIONS

Cox, Charles H., et al., "Limits on the Performance of RF-Over-Fiber Links and Their Impact on Device Design", IEEE Transactions on Microwave Theory and Techniques, vol. 54, No. 2, Feb. 2006, 906-921.

(Continued)

*Primary Examiner* — Dibson J Sanchez
(74) *Attorney, Agent, or Firm* — Sage Patent Group

(57) ABSTRACT

A hybrid multiplexing apparatus is provided for multiplexing a digital communication signal from an electrical domain with one or more analog subcarrier communication signals from the electrical domain into a multiplexed optical signal for transmission over a common optical communication link. The apparatus comprises a laser module configured to modulate a laser source with the one or more analog subcarrier communication signals to be multiplexed, and output an intermediate optical modulated signal. An electro-optical modulator is coupled to receive the intermediate optical modulated signal and the digital communication signal to be multiplexed, and configured to modulate the intermediate optical modulated signal with the digital communication signal to form the multiplexed optical signal.

16 Claims, 15 Drawing Sheets

(58) Field of Classification Search
USPC .................................. 398/43–103, 182–201
See application file for complete search history.

(56) References Cited

U.S. PATENT DOCUMENTS

| | | | | |
|---|---|---|---|---|
| 5,351,148 | A * | 9/1994 | Maeda | H04B 10/504 348/E7.094 |
| 5,425,050 | A * | 6/1995 | Schreiber | H04B 1/707 348/384.1 |
| 5,450,392 | A * | 9/1995 | Waltrich | H04B 1/109 348/21 |
| 5,477,368 | A * | 12/1995 | Eskildsen | H04B 10/2537 359/334 |
| 5,483,373 | A * | 1/1996 | Bulow | H04B 10/504 398/185 |
| 5,510,743 | A * | 4/1996 | Shi | H03F 1/3252 327/100 |
| 5,532,748 | A * | 7/1996 | Naimpally | H04N 5/4401 348/554 |
| 5,550,667 | A * | 8/1996 | Krimmel | H04B 10/2537 398/193 |
| 5,680,238 | A * | 10/1997 | Masuda | H04J 14/0298 14/298 |
| 5,748,348 | A * | 5/1998 | Heidemann | H04H 20/69 348/E7.094 |
| 5,768,449 | A * | 6/1998 | Fuse | H04B 10/504 385/1 |
| 5,777,771 | A * | 7/1998 | Smith | H04B 10/25758 398/182 |
| 5,825,518 | A * | 10/1998 | Maeda | H04J 4/0298 398/76 |
| 5,828,477 | A * | 10/1998 | Nilsson | H04B 10/2537 398/185 |
| 5,930,024 | A | 7/1999 | Atlas | |
| 5,949,813 | A * | 9/1999 | Hunsinger | H04B 1/406 375/142 |
| 6,181,450 | B1 * | 1/2001 | Dishman | H04B 7/18521 370/281 |
| 6,490,727 | B1 * | 12/2002 | Nazarathy | H04J 14/0226 348/E7.071 |
| 6,535,315 | B1 * | 3/2003 | Way | H04B 10/2537 398/182 |
| 6,667,994 | B1 * | 12/2003 | Farhan | H04J 3/1605 348/E7.069 |
| 7,103,285 | B1 * | 9/2006 | Okuno | H04B 10/504 398/185 |
| 7,936,997 | B2 * | 5/2011 | Ramachandran | H04B 10/25751 398/192 |
| RE44,647 | E * | 12/2013 | Iannelli | H04B 10/504 398/186 |
| 9,356,702 | B2 * | 5/2016 | Yu | H04B 10/504 |
| 9,559,780 | B2 * | 1/2017 | Schemmann | H04B 10/588 |
| 9,973,278 | B2 * | 5/2018 | Wang | H04B 10/5161 |
| 10,284,324 | B2 * | 5/2019 | Ponzini | H04L 5/023 |
| 2002/0030877 | A1 * | 3/2002 | Way | H04B 10/50 398/185 |
| 2002/0067883 | A1 * | 6/2002 | Lo | H04B 10/532 385/24 |
| 2002/0101640 | A1 * | 8/2002 | Snawerdt | H04B 10/85 398/188 |
| 2003/0076567 | A1 | 4/2003 | Matthews et al. | |
| 2003/0152386 | A1 * | 8/2003 | Vohra | H04J 14/0228 398/76 |
| 2003/0198478 | A1 * | 10/2003 | Vrazel | H04B 10/505 398/183 |
| 2005/0254825 | A1 * | 11/2005 | Bai | H04B 10/0775 398/155 |
| 2006/0018667 | A1 * | 1/2006 | Lee | H04B 10/505 398/186 |
| 2006/0067698 | A1 * | 3/2006 | Chan | H04B 10/25751 398/141 |
| 2006/0210282 | A1 * | 9/2006 | Iannelli | H04B 10/505 398/186 |
| 2007/0147848 | A1 * | 6/2007 | Vieira | H04B 10/505 398/183 |
| 2008/0130696 | A1 * | 6/2008 | Shahine | H01S 5/0265 372/38.02 |
| 2009/0110408 | A1 * | 4/2009 | Dallesasse | H04B 10/504 398/185 |
| 2011/0150484 | A1 * | 6/2011 | Wang | H04B 10/2537 398/115 |
| 2012/0068614 | A1 * | 3/2012 | Ng | H05B 33/0851 315/185 R |
| 2013/0125194 | A1 * | 5/2013 | Finkelstein | H04L 12/2801 725/129 |
| 2013/0200948 | A1 * | 8/2013 | Lee | H03F 1/3247 330/10 |
| 2016/0150198 | A1 * | 5/2016 | Hashiguchi | H04N 7/22 398/115 |
| 2017/0093497 | A1 * | 3/2017 | Ling | H04B 10/25133 |

OTHER PUBLICATIONS

Ponzini, Filippo et al., "Hybrid Analog/Digital Multiplexing for Fiber to the Antenna Applications," Ericsson, Apr. 27, 2015, 3 pages.

* cited by examiner

METHODS AND APPARATUS FOR MULTIPLEXING SIGNALS

TECHNICAL FIELD

The embodiments described herein relate to methods and apparatus for multiplexing signals, and in particular to methods and apparatus for multiplexing digital and analog signals, for example analog 3GPP signals and digital Ethernet signals.

BACKGROUND

In the field of telecommunications, the use of small-cells in high capacity radio access networks is becoming more and more significant. Going forward, a large proportion of radio access traffic will be generated indoors (for example in offices, homes, shopping malls, etc.). Access to high speed and high performance telecommunication networks, for example $3^{rd}$ Generation Partnership Project (3GPP) networks such as High Speed Packet Access (HSPA) networks or Long Term Evolution (LTE) networks will coexist in a more efficient way with other local communication networks, such as those having Wi-Fi traffic (e.g. 802.11x).

Common backhaul lines for 3GPP traffic and Wi-Fi traffic is highly desirable, and today most of the small radio base station solutions are able to also provide Wi-Fi service. In some systems having combined 3GPP and WiFi traffic, a common Ethernet link can be used to backhaul both 3GPP and Wi-Fi traffic from an aggregation node at a small-cell site. The use of such a common Ethernet link requires 3GPP and Wi-Fi processing at the small-cell site, and in particular baseband processing of the 3GPP traffic at the small-cell site, which can present drawbacks.

SUMMARY

It is an aim of the present invention to provide a method and apparatus which obviate or reduce at least one or more of the disadvantages mentioned above.

According to a first aspect of the present invention there is provided a hybrid multiplexing apparatus for multiplexing a digital communication signal from an electrical domain with one or more analog subcarrier communication signals from the electrical domain into a multiplexed optical signal for transmission over a common optical communication link. The apparatus comprises a laser module configured to modulate a laser source with the one or more analog subcarrier communication signals to be multiplexed, and output an intermediate optical modulated signal. The apparatus comprises an electro-optical modulator coupled to receive the intermediate optical modulated signal and the digital communication signal to be multiplexed, and configured to modulate the intermediate optical modulated signal with the digital communication signal to form the multiplexed optical signal.

According to another aspect of the present invention there is provided a method in a node of a telecommunication network, for multiplexing a digital communication signal from an electrical domain with one or more analog subcarrier communication signals from the electrical domain into a multiplexed optical signal for transmission over a common optical communication link. The method comprises modulating a laser source with the one or more analog subcarrier communication signals to be multiplexed, to output an intermediate optical modulated signal. The method comprises modulating using an electro-optical modulator the intermediate optical modulated signal and the digital communication signal to be multiplexed, to form the multiplexed optical signal.

According to another aspect there is provided a computer program, comprising instructions which, when executed on at least one processor, causes the at least one processor to carry out the method as defined in the appended claims. There is also provided a carrier comprising such a computer program, wherein the carrier is one of an electronic signal, optical signal, radio signal or computer readable storage medium.

The embodiments described herein have an advantage, for example, of allowing a digital communication signal, for example a WiFi communication signal which has been converted into a high speed digital signal, such as a GigaBit Ethernet (GbE) digital signal for digital backhaul, to be combined with one or more analog subcarrier signals, for example analog subcarrier signals relating to analog radio signals of a 3GPP telecommunication network, for example HSPA or LTE networks.

The embodiments described herein also have an advantage of requiring only one laser source in a laser module, without having other disadvantages that might arise if the analog and digital signals were combined in the electrical domain, for example disadvantages arising from a tradeoff that would be required to perform on a common transmitter the modulation of analog and digital signals, such as different requirements in terms of linearity, extinction ratio and dynamic range.

BRIEF DESCRIPTION OF THE DRAWINGS

For a better understanding of examples described herein, and to show more clearly how the examples may be carried into effect, reference will now be made, by way of example only, to the following drawings in which.

DETAILED DESCRIPTION

Figure 1A:
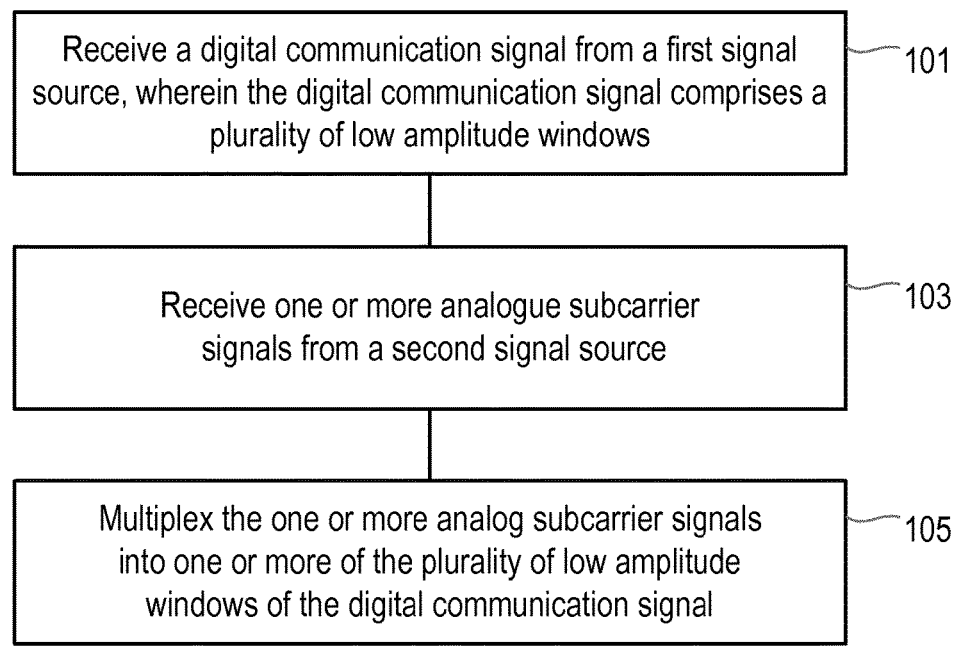
FIG. 1a shows a method according to an example.

In the examples described herein reference will be made to multiplexing and/or demultiplexing analog and digital signals in telecommunication networks, for example analog signals relating to $3^{rd}$ Generation Partnership Project (3GPP) networks such as High Speed Packet Access (HSPA) networks or Long Term Evolution (LTE) networks, and digital signals relating to local communication networks, such as WiFi networks. It is noted, however, that the embodiments are not limited to these specific examples, and that digital and analog signals from other communication systems, or other environments, may also be multiplexed and/or demultiplexed in the manner described in the examples.

As mentioned in the background section, in some examples of combined 3GPP and WiFi traffic, a common Ethernet link can be used to backhaul both 3GPP and Wi-Fi traffic from an aggregation node at a small-cell site. The use of such a common Ethernet link requires 3GPP and Wi-Fi processing at the small-cell site, for example baseband processing of 3GPP signals which can present drawbacks.

3GPP and Wi-Fi traffic have some important differences. For example, Wi-Fi is based on an unregulated access to the radio resources, with comparatively poor handling of the mobility and concurrent connections of users. On the other hand, 3GPP radio access technologies such as HSPA or LTE offer regulated access to the radio resources and are much more efficient in managing interferences, high number of users (concurrent access) and their mobility.

Most of the features offered by HSPA or LTE require coordination between small-cells, and this can be difficult to achieve if 3GPP baseband processing is carried out at the small-cell site.

Centralization of baseband processing for a group of radio base stations, regardless of whether the radio base stations relate to macro-cells, small-cells or a combination of them, remains a desired option to increase HSPA/LTE performance and radio access network capacity.

Radio over fiber (RoF) is a technology able to transport radio signals over fiber, so that they are ready to be transmitted over the air (analog RoF) or digital-to-analog converted and associated to a proper radio carrier (digital RoF or Common Public Radio Interface, CPRI).

Although centralized baseband processing is possible over RoF, unfortunately it has drawbacks. One such drawback is that it is not cost effective, because it requires higher bandwidth and/or highly linear optical/electrical converters to guarantee good dynamic and low distortions. Another drawback is that it is not suitable to transport Wi-Fi radio channels to a centralized processing site, because this is not competitive in terms of cost (for example because Wi-Fi access does not receive much benefit from a centralized baseband processing, and because Wi-Fi chipsets are available at extremely low cost).

Current small-cells solutions are based on a local baseband processing, eventually providing also Wi-Fi access, or are based on a centralized processing of 3GPP data, for example using a system known as a Radio DOT System by the present Applicant.

The Radio DOT System allows the provision of a capillary 3GPP indoor coverage by distributing analog signals over copper at an intermediate frequency. Fiber backhaul small-cells solutions are under investigation to increase the distance of antenna elements from the first aggregation point (e.g. site routers or digital units). Unfortunately, using radio dots for Wi-Fi is not cost effective due to the cost of conversion at intermediate frequency, and due to dynamic power range problems.

The embodiments described below provide a hybrid analog and digital multiplexing solution whereby analog radio signals (for example narrowband 3GPP radio signals) are multiplexed with a digital signal (for example a high data rate digital WiFi signal) for transmission over a transmission medium, for example an optical fiber.

As will be described in greater detail below, the embodiments described herein have the advantage of enabling 3GPP signals to be transported in their usual format up to a centralized baseband processing site (for example as one or more narrowband analog subcarrier signals, hence not requiring baseband processing at the small-cell site), while other network traffic, such as Wi-Fi traffic, can be terminated at the small-cell site and backhauled in a digital manner, for example over a high data rate Ethernet connection.

FIG. 1 shows a method in a node of a telecommunication network according to an example described in co-pending application PCT/EP2015/059100 by the present Applicant. The method comprises receiving a digital communication signal from a first signal source, wherein the digital communication signal comprises a plurality of low amplitude windows, step 101. The method comprises receiving one or more analog subcarrier signals from a second signal source, step 103. The one or more analog subcarrier signals are multiplexed into one or more of the plurality of low amplitude windows of the digital communication signal, step 105.

This has the advantage of allowing a digital communication signal, for example a WiFi communication signal which has been converted into a high speed digital signal, such as a GbE digital signal for digital backhaul, to be combined with one or more analog subcarrier signals, for example analog subcarrier signals relating to analog radio signals of a 3GPP telecommunication network, for example HSPA or LTE networks.

The method may comprise multiplexing a plurality of analog subcarrier signals into each of one or more low amplitude windows (or notches) of the digital communication signal. In some examples different numbers of analog signals can be multiplexed into different low amplitude windows, for example one analog subcarrier signal into one notch, two analog subcarrier signals into another notch, and so on in any combination, and any number (depending for example on the width of the narrowband analog signals, and the width of the low amplitudes windows).

Analog 3GPP subcarrier signals have a quite compact spectrum compared with GbE (for example 40 MHz signals being sufficient for 2×2 MIMO 20 MHz LTE signals), and as such it is possible to accommodate one or even more radio signals in each notch (low amplitude window). The number of analog signals interposed in each low amplitude window can depend, for example, on the required end to end performance.

According to one example, the manner in which one or more analog subcarrier signals are multiplexed into the one or more low amplitude windows (notches) of the digital communication signal can be determined, for example, according to one or more of the following criteria:

the central frequency and bandwidth of a low amplitude window (which may in turn be determined according to end to end performance);

the bandwidth of each analog subcarrier signal;

the total number of analog subcarrier signals;
the required dynamic range and/or noise tolerance of each analog subcarrier signal (which can determine the useable notch bandwidth);
the minimum signal to noise ratio tolerated by a digital receiver coupled to receive the multiplexed signal.

In some examples the plurality of low amplitude windows of the digital communication signal are periodic. In such examples, the method may comprise selecting an intermediate frequency used to up convert the analog subcarrier signals such that the intermediate frequency matches the periodicity of the low amplitude windows of the digital communication signal.

This provides signals that are weakly superimposed in frequency, which has an advantage of enabling mutual interferences to be reduced.

The one or more analog subcarrier signals may comprise telecommunication radio signals, such as 3GPP communication signals, for example HSPA or LTE or other such telecommunication networks, while the digital communication signals may comprise, for example, local network communication signals, such as a GigaBit Ethernet, GbE, signal used to transport WiFi communication signals. It is noted that WiFi is only an example, and that the digital communication signal may comprise any type of traffic that it is terminated at the radio cell (e.g. small-cell or DOT) and backhauled by a high speed digital signal which presents periodic low amplitude windows. For example, also a 3GPP signal (e.g. LTE or LTE Advanced) terminated at the small-cell site and backhauled with GbE can be processed in the same way as Wi-Fi. In such an example case, it is possible to have 3GPP signals terminated at a small-cell site and backhauled with GbE while other 3GPP signals that need centralized baseband processing are analog multiplexed with the GbE signal.

Figure 1B:
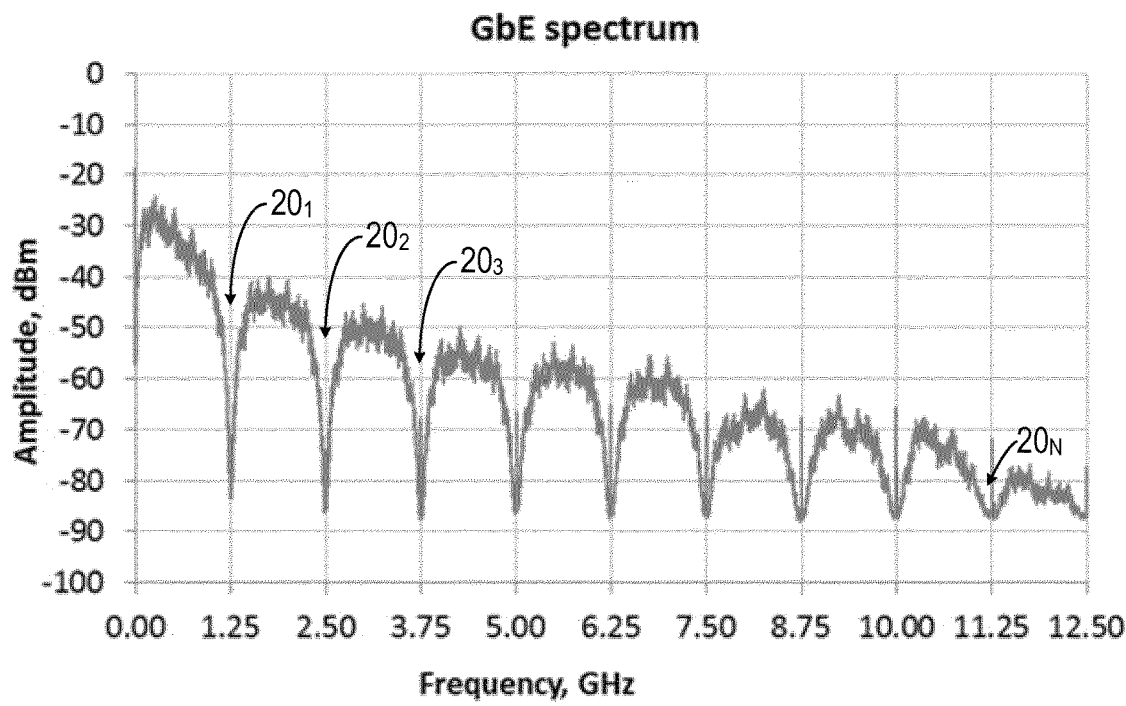
FIG. 1b illustrates an example of an amplitude versus frequency spectrum for a digital signal.

FIG. 1b shows an example of a digital signal, and in particular an example of the amplitude versus frequency spectrum of a GigaBit Ethernet (GbE) signal. In this example the GbE signal has a data rate of 1.25 Gbps, and as such the spectrum of the GbE signal comprises periodic notches, at 1.25 GHz, 2.5 GHz, and so on. These notches are the low amplitude windows in which the narrowband analog subcarrier signal(s) are accommodated according to the embodiments described herein. By multiplexing analog subcarrier signals, such as 3GPP signals (HSPA/LTE) in GbE notches, the crosstalk of Ethernet over analog 3GPP signal (and vice versa) is lower.

As mentioned above, an Intermediate Frequency (IF) used to up convert the analog 3GPP subcarrier signals may be selected to match the notches (low amplitude windows) in the spectrum of the digital signal, in order to have signals that are weakly superimposed in frequency. In other words, the one or more analog subcarrier signals can be up converted at a specific intermediate frequency, which matches the notches in the digital spectrum. This has the advantage of enabling mutual interferences to be reduced. In this way analog components are seen as additional noise sources by the digital signal and vice versa.

Figure 2:
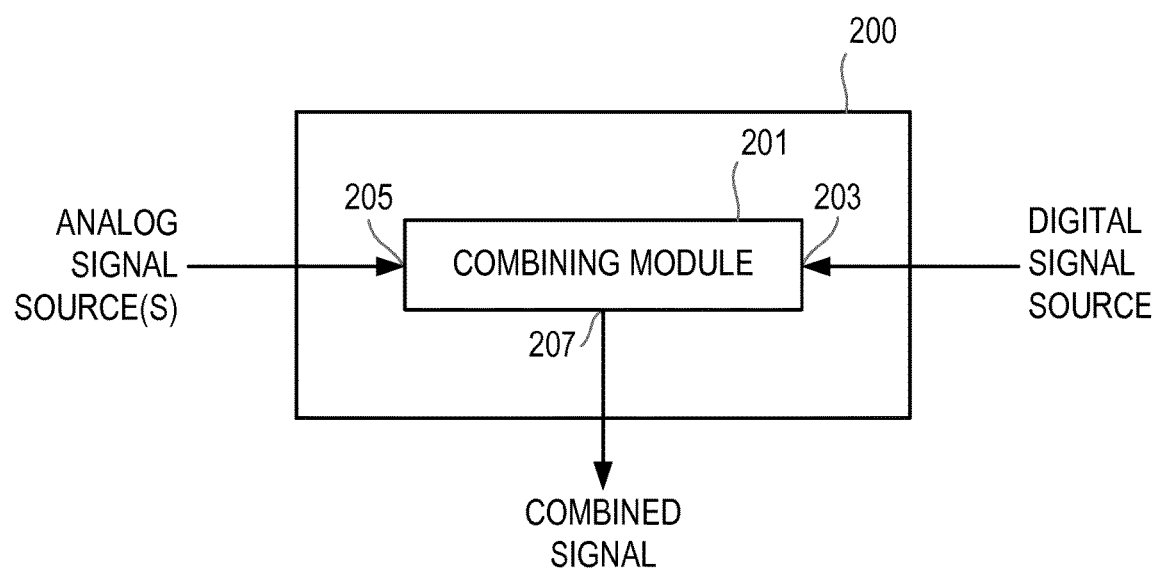
FIG. 2 shows a multiplexing apparatus according to an example.

FIG. 2 shows an example of a multiplexing apparatus 200 according to co-pending application PCT/EP2015/059100. The multiplexer apparatus 200 comprises a combining module 201.

The combining module 201 comprises a first input node 203 coupled to receive a digital communication signal from a first signal source (for example a first signal source providing WiFi traffic signals), wherein the digital communication signal comprises a plurality of low amplitude windows. The combining module 201 further comprises a second input node 205 coupled to receive one or more analog subcarrier signals from a second signal source (for example a second signal source providing 3GPP radio signals).

The combining module 201 is configured to multiplex the one or more analog subcarrier signals into one or more of the plurality of low amplitude windows of the digital communication signal. The combining module 201 further comprises an output node 207 to output the multiplexed signal.

Next there will be described further examples of how the digital and analog signals may be combined. The examples described below are based on electrically multiplexing and optically multiplexing the analog (3GPP) and digital (GbE) signals. FIGS. 3 to 6 describe examples involving electrical multiplexing according to co-pending application PCT/EP2015/059100, while FIGS. 7 to 10 describe examples involving optical multiplexing according to co-pending application PCT/EP2015/059100, while FIGS. 11 to 14 describe embodiments of the present invention. As will be seen, with all the examples the use a common receiver is possible, also in the case of GbE and 3GPP signals transmitted over fiber by using dedicated wavelengths. It is noted that other arrangements may also be used to multiplex the analog and digital signals, and that other transmission mediums may also be used.

Figure 3:
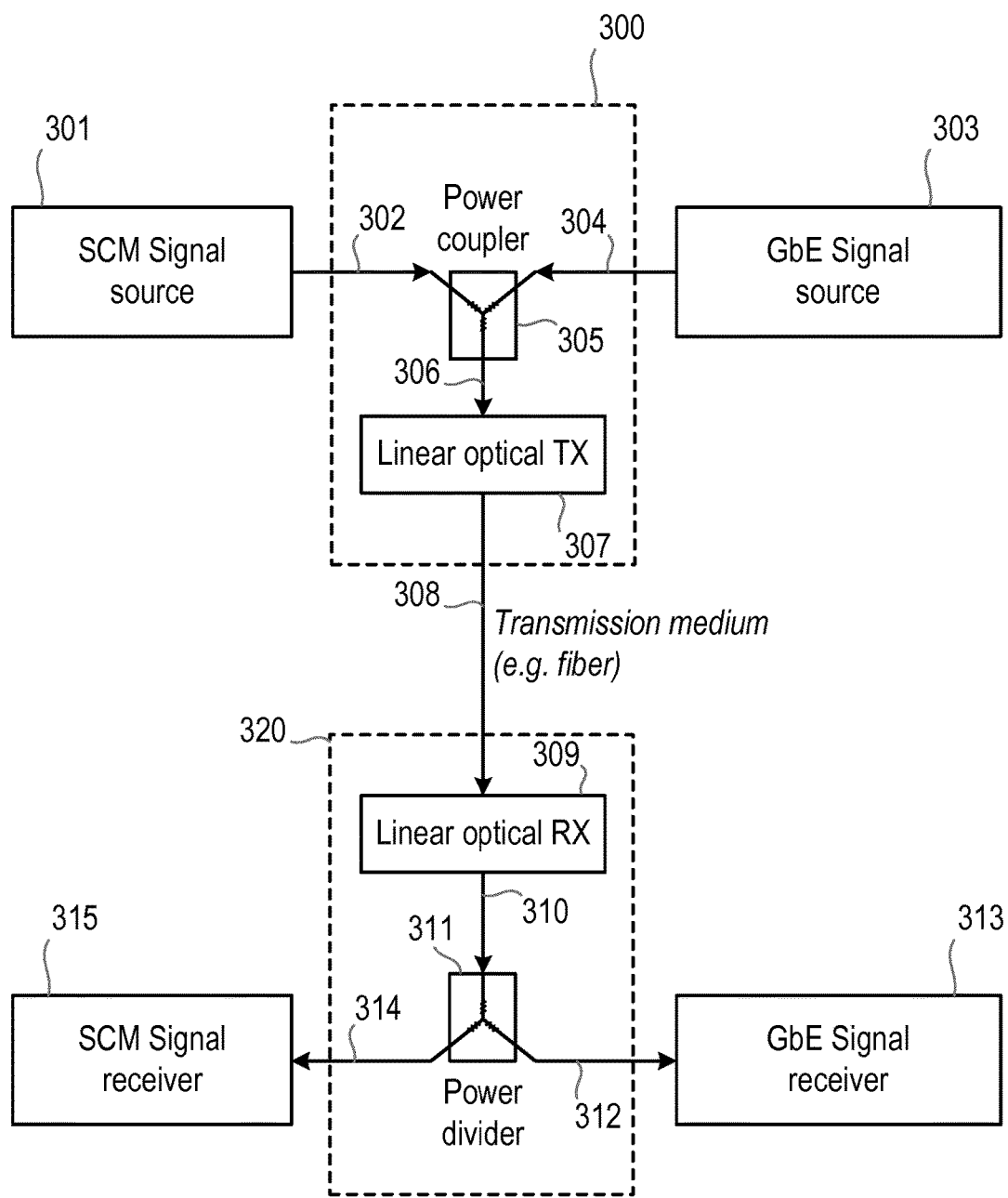
FIG. 3 shows an application of a multiplexing apparatus according to an example.

According to the example shown in FIG. 3, the hybrid multiplexing of a digital signal and analog signal(s) is realized in the electrical domain, after which the composite signal is used to modulate an optical carrier.

A node 300 at the point of aggregation, for example at a small-cell node, receives an electrical analog signal 302 provided, for example, by a sub-carrier multiplexing (SCM) signal source 301. The node 300 also receives an electrical digital signal 304 provided, for example, by a GbE signal source 303.

The SCM signal source 301 presents narrow band subcarriers (e.g. 40 Mhz) which, as mentioned earlier, may be spaced apart to match the low amplitude windows (notches) in the digital signal, for example spaced apart by 1.25 GHz in the example of FIG. 1b. In one example, only one subcarrier is used. It is noted that although the SCM signal source 301 is shown as being separate to the node 300, the SCM signal source may form part of the node 300. Likewise, although the GbE signal source is shown as being separate to the node 300, the GbE signal source may form part of the node 300.

The node 300 comprises a combining unit 305 for multiplexing the electrical analog signal(s) 302 with the electrical digital signal 304, for example using a power coupler. It is noted that other apparatus and methods may also be used to combine the analog and digital signals electrically. A common linear photo-transceiver 307 receives the combined electrical analog and digital signal 306, and converts this combined signal into a combined analog and digital optical signal, for transmission to a receiver over a transmission medium 308, for example over an optical fiber.

Thus, according to this example, there is provided a multiplexing apparatus (for example the node 300) comprising a combining module, wherein the combining module comprises an electrical combining module 305 for combining an electrical digital communication signal 304 with one or more electrical analog subcarrier signals 302.

In this example the multiplexing apparatus (or node 300) further comprises an optical transmitter, for example a linear optical transmitter 307, for converting the combined one or more analog subcarrier signals 302 and digital communication signal 304 into a combined optical signal for transmission over an optical transmission medium 308.

At the receiver side, a receiver 320 comprises an optical frontend, for example a linear optical receiver 309 (photo-receiver). After photo detection and conversion to a combined electrical analog and digital signal 310, the combined electrical signal is coupled to a demultiplexing module, for example a power divider 311 comprising two different electrical receivers: a first one dedicated to the detection of the one or more analog subcarrier signals (SCM signals), and a second one for detecting the digital communication signal (for example the digital GbE signal). The demultiplexing module 311 comprises a first output node to output the digital communication signal, for example to a digital receiver, such as a GbE signal receiver 313, and a second output node to output the one or more analog subcarrier signals to an analog signal receiver, for example a SCM signal receiver 315.

One advantage of the arrangement shown in the example of FIG. 3 is the use of a single optical transmitter 307 for the hybrid signal.

Figure 4:
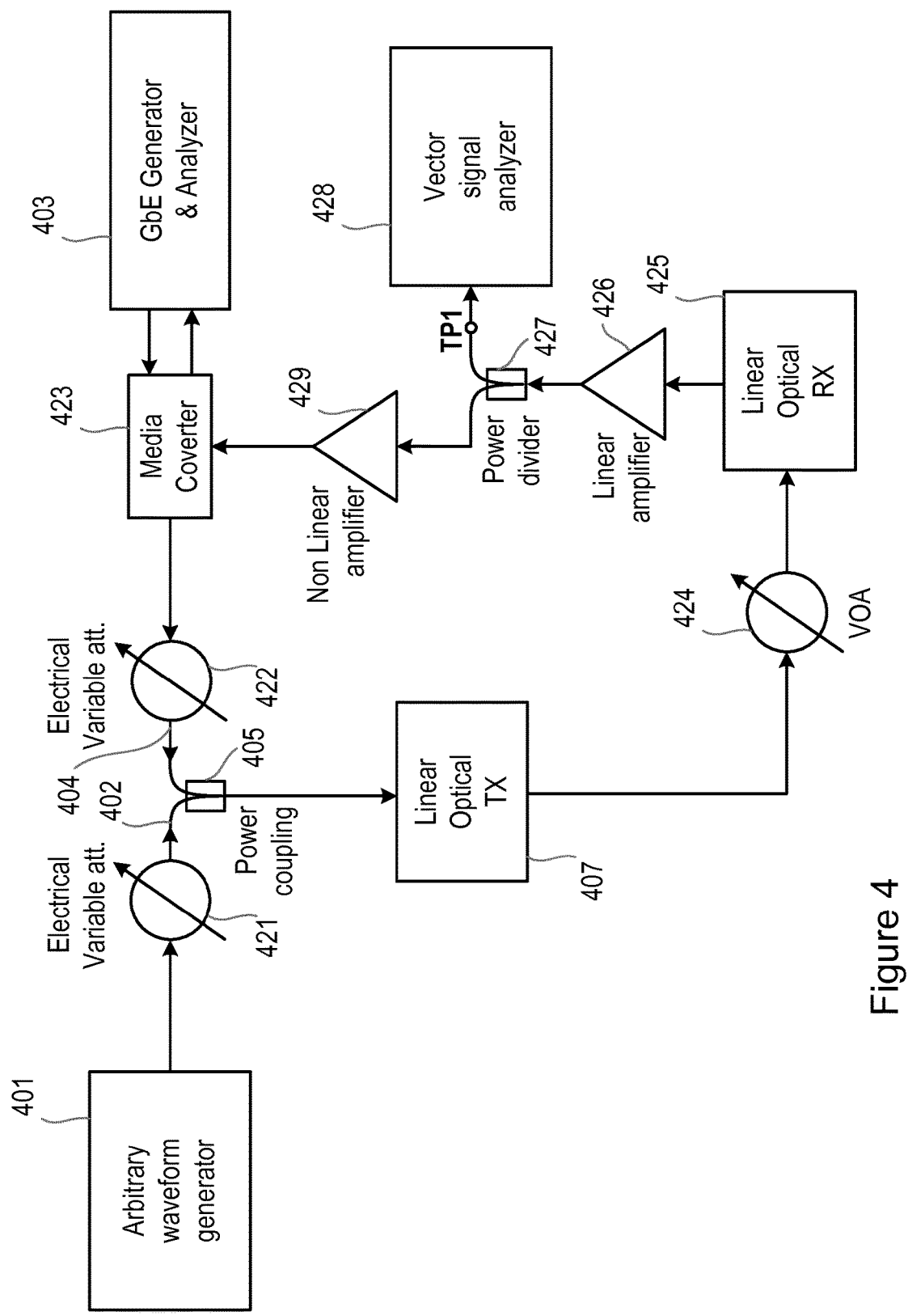
FIG. 4 shows an example of a test arrangement for the example of FIG. 3.

FIG. 4 shows as an example a laboratory test arrangement for testing the arrangement of FIG. 3. The example multiplexing one 64QAM signal with 40 Mbaud at the center of the GbE first notch. The lab setup and the hybrid multiplexed signal after optical transmission and detection with a linear optical receiver with 3 GHz of bandwidth are shown in FIG. 4.

In this example of a test arrangement, a power coupling 405 combines a 64QAM 40 Mbaud signal 402 provided by an arbitrary waveform generator 401 with a digital communication signal, GbE, provided by a GbE generator and analyzer 403. The electrical variable attenuators 421 and 422 are used to test system performance with different values of electrical power. Module 407 is a linear optical transmitter (for the analog signal). Optical power at the receiver side is controlled by a variable optical amplifier (VOA) 424. After photo detection by an optical receiver 425 the combined signal is linearly and electrically amplified by a linear amplifier 426, and then demultiplexed by the power divider 427 and conveyed to a vector signal analyzer 428 (e.g. a 3GPP receiver) and to a non-linear amplifier 429 for power conversion, media converter 423 for media conversion and the GbE Generator/Analyzer 403 for GbE reception. It is noted that FIG. 4 represents an example of a lab arrangement, and as such not all the blocks are necessary (e.g. media converter 423 has been inserted for converting the optical input/output of GbE generator/analyzer 403 in the electrical domain because it provides optical input/output).

Figure 5:
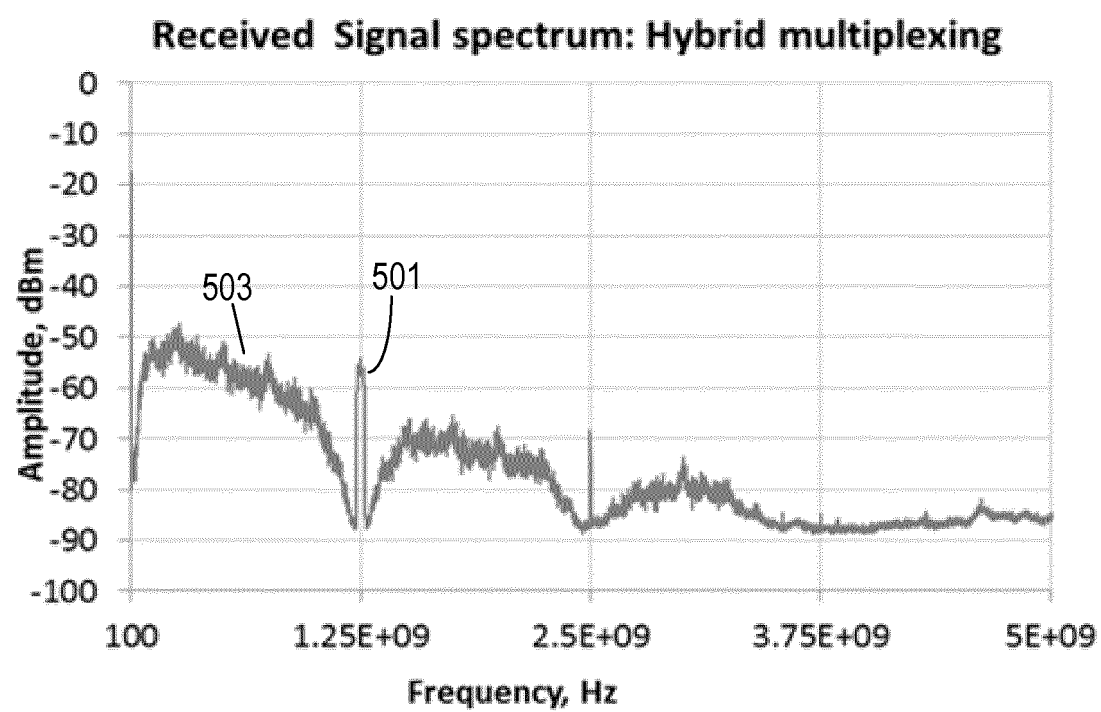
FIG. 5 shows an example of an amplitude versus frequency spectrum showing the results of the test arrangement of FIG. 4.

Referring to FIG. 5, this shows the spectrum of the hybrid multiplexed signal, which includes a digital communication signal (GbE digital signal) combined with just one analog subcarrier signal in this example (i.e. one 64QAM analog signal at 40 MHz). It corresponds to the point labelled TP1 in FIG. 4, and has been photo detected by a receiver with a 3 GHz bandwidth. FIG. 5 shows the analog signal 501 multiplexed in the first notch of the digital communication signal 503.

Figure 6:
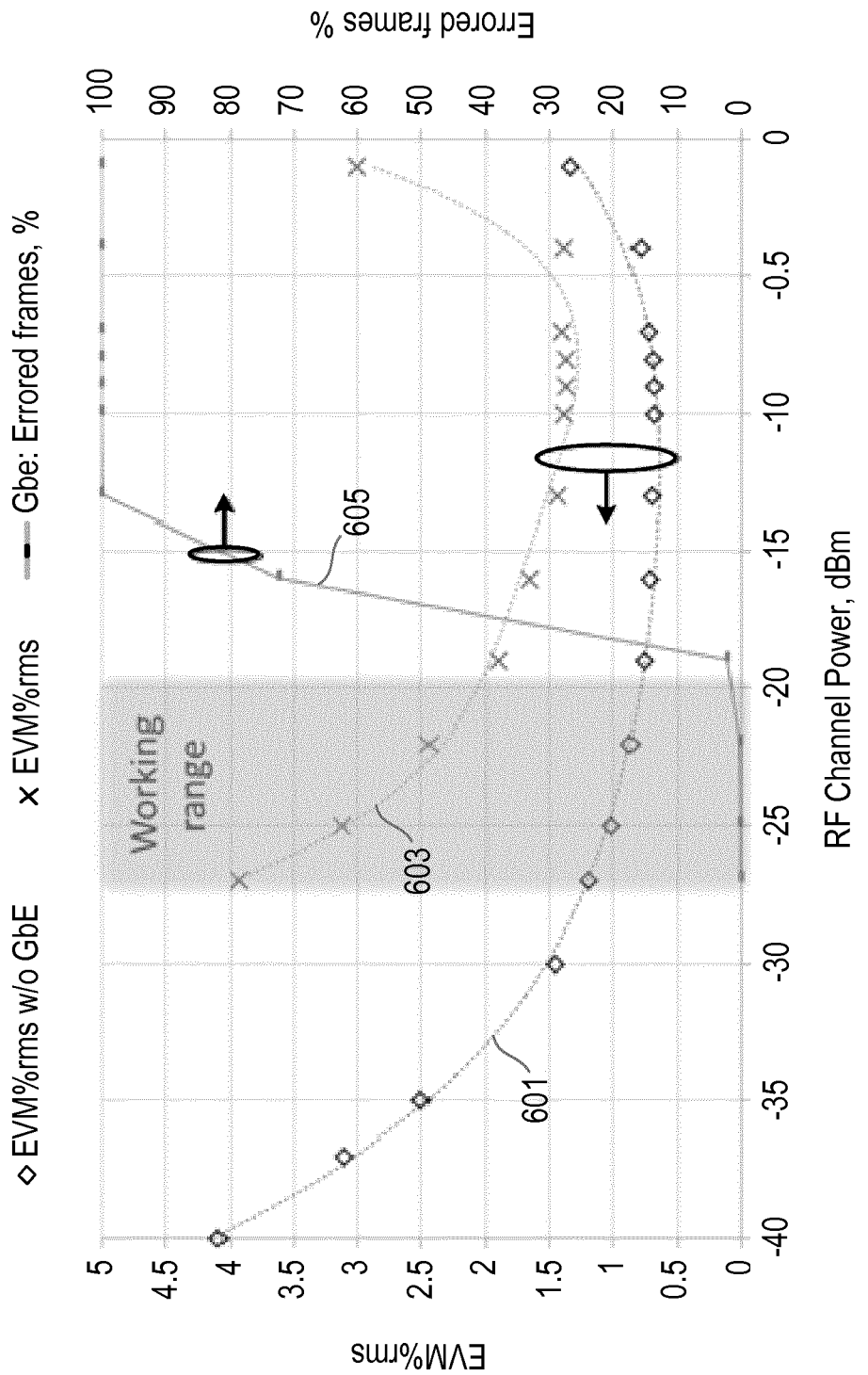
FIG. 6 shows an example of overall performance of the example shown in FIG. 3.

Changing the power of the 3GPP signal can impact the overall performance of both digital and the analog receivers. Referring to FIG. 6 there is a region corresponding to a RF channel in a range between −27 dBm to −20 dBm (shown as the shaded working region), where end to end Error-Vector Magnitude (EVM, labelled 601/603) of the 64QAM signal is more than acceptable (i.e. whereby it always stays below 4% rms) and the GbE receiver works without errors (as shown by the error curve 605).

Of the curves shown in FIG. 6, two of them show the measured EVM % rms of 64QAM signal with and without impairments inducted by GbE signal, i.e. curves 603 and 601, respectively, with the other curve 605 showing the performance of GbE as a function of the 64QAM RF power.

Figure 7:
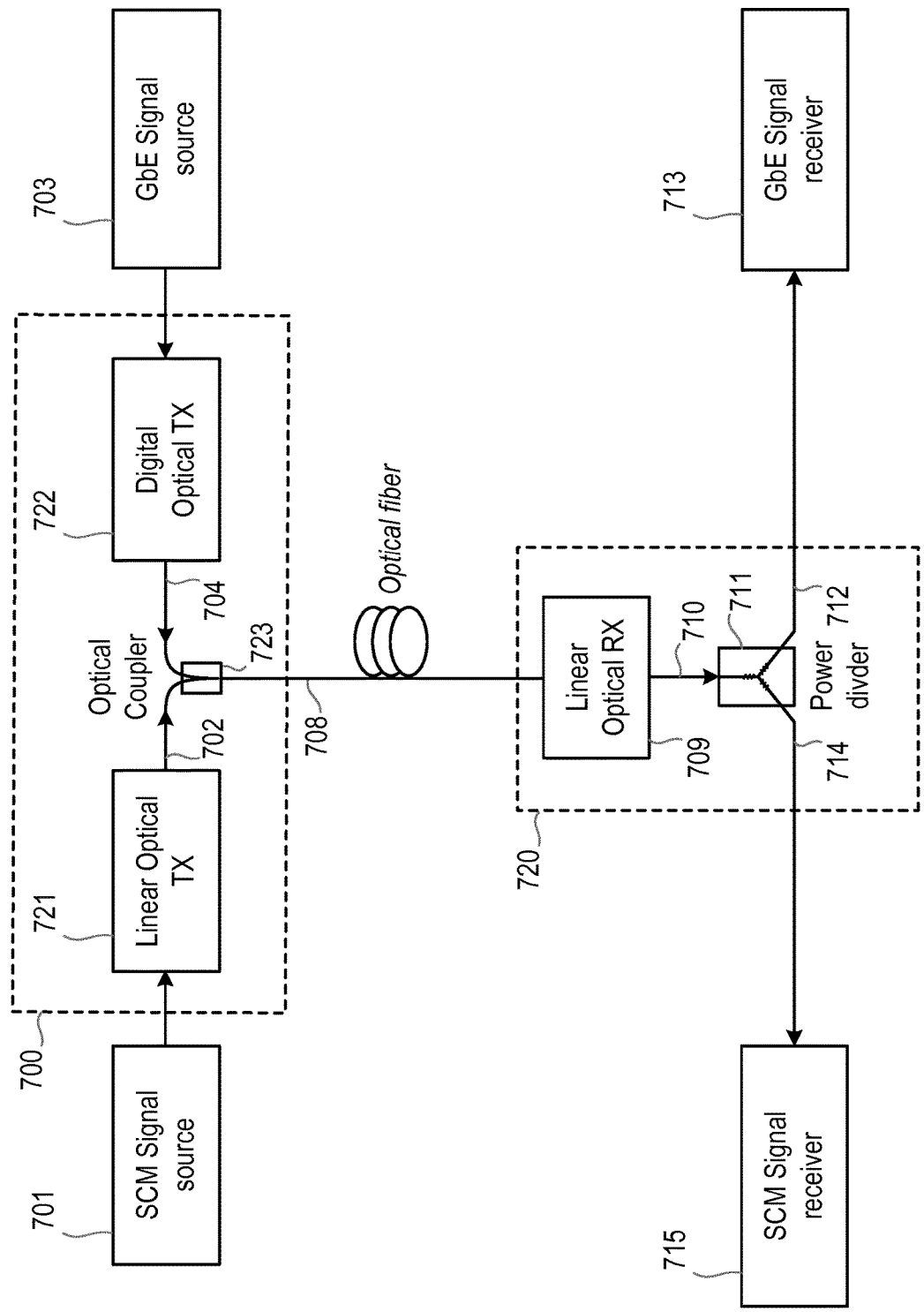
FIG. 7 shows another application of a multiplexing apparatus according to another example.

FIG. 7 shows an example according to co-pending application PCT/EP2015/059100 in which the hybrid multiplexing of a digital signal and analog signal(s) is realized in the optical domain, after which the composite signal is used to modulate an optical carrier.

A node 700 at the point of aggregation, for example at a small-cell node, comprises a linear optical transmitter 721 which receives electrical analog subcarrier signals from an analog signal source 701, and converts the electrical analog signals into optical analog subcarrier signals 702. A digital optical transmitter 722 receives electrical digital communication signals from a digital signal source 703, and converts the electrical digital communication signals into optical digital communication signals 704.

The SCM signal source 701 presents narrow band subcarriers (e.g. 40 Mhz) which, as mentioned earlier, may be spaced apart to match the low amplitude windows (notches) in the digital signal, for example spaced apart by 1.25 GHz in the example of FIG. 1b. In one example, only one subcarrier is used. It is noted that although the SCM signal source 701 is shown as being separate to the node 700, the SCM signal source may form part of the node 700. Likewise, although the GbE signal source 703 is shown as being separate to the node 700, the GbE signal source 703 may form part of the node 700.

The node 700 comprises a combining unit 723 for multiplexing the optical analog signal(s) 702 with the optical digital signal 704, for example using an optical coupler. It is noted that other apparatus and methods may also be used to combine the analog and digital signals optically. The combined optical analog and digital signal is transmitted over a transmission medium 708, for example over an optical fiber.

Thus, the arrangement of FIG. 7 is based on optical multiplexing the two tributary signals. This example comprises two different optical transmitters, one for the analog signal and the second one for the digital signal. The optical transmitters may include a laser source. No laser cooling or wavelength stabilization are needed, enabling the use of low cost optical transmitters. The two optical carriers may be selected with different nominal wavelengths to avoid in band beating noise at the receiver side.

Thus, in the example of FIG. 7, a multiplexing apparatus (node 700) comprises a combining module in the form of an optical combining module 723, for combining an optical digital communication signal 704 with one or more optical analog subcarrier signals 702. The optical combining module 723 may comprise an optical coupler.

The multiplexing apparatus may further comprise a linear optical transmitter 721 configured to convert one or more received electrical analog subcarrier signals into one or more analog optical subcarrier signals 702 received by the optical combining module 723, and a digital optical transmitter 722 configured to convert a received electrical digital communication signal into an optical digital communication signal 704 received by the optical combining module 723.

At the receiver side, a receiver 720 comprises an optical frontend, for example a linear optical receiver 709 (photo-receiver). After photo detection and conversion to a combined electrical analog and digital signal 710, the combined electrical signal is coupled to a demultiplexing module, for example a power divider 711 comprising two different electrical receivers: a first one dedicated to the detection of the one or more analog subcarrier signals (SCM signals), and a second one for detecting the digital communication signal (for example the digital GbE signal). The demultiplexing module 711 comprises a first output node to output the digital communication signal, for example to a digital receiver, such as a GbE signal receiver 713, and a second output node to output the one or more analog subcarrier signals to an analog signal receiver, for example a SCM signal receiver 715.

It is noted that in the example of FIG. 7 (and that of FIG. 3 above), there are no dedicated electrical or optical filters used: the same hybrid multiplexed signal is sent to the digital (GbE) and analog (64QAM) receivers: the GbE receiver perceives the SCM signal as a tolerable noise and the SCM signal receiver filters out the GbE signal. This has an advantage that demultiplexing can be performed by a simple power divider.

An advantage of the example shown in FIG. 7 is the possibility to design in a cost effective way the two different optical transmitters tailored for the two types of tributary signals, i.e. the optical transmitters 721 and 722 for the analog and digital tributary signals, respectively.

Figure 8:
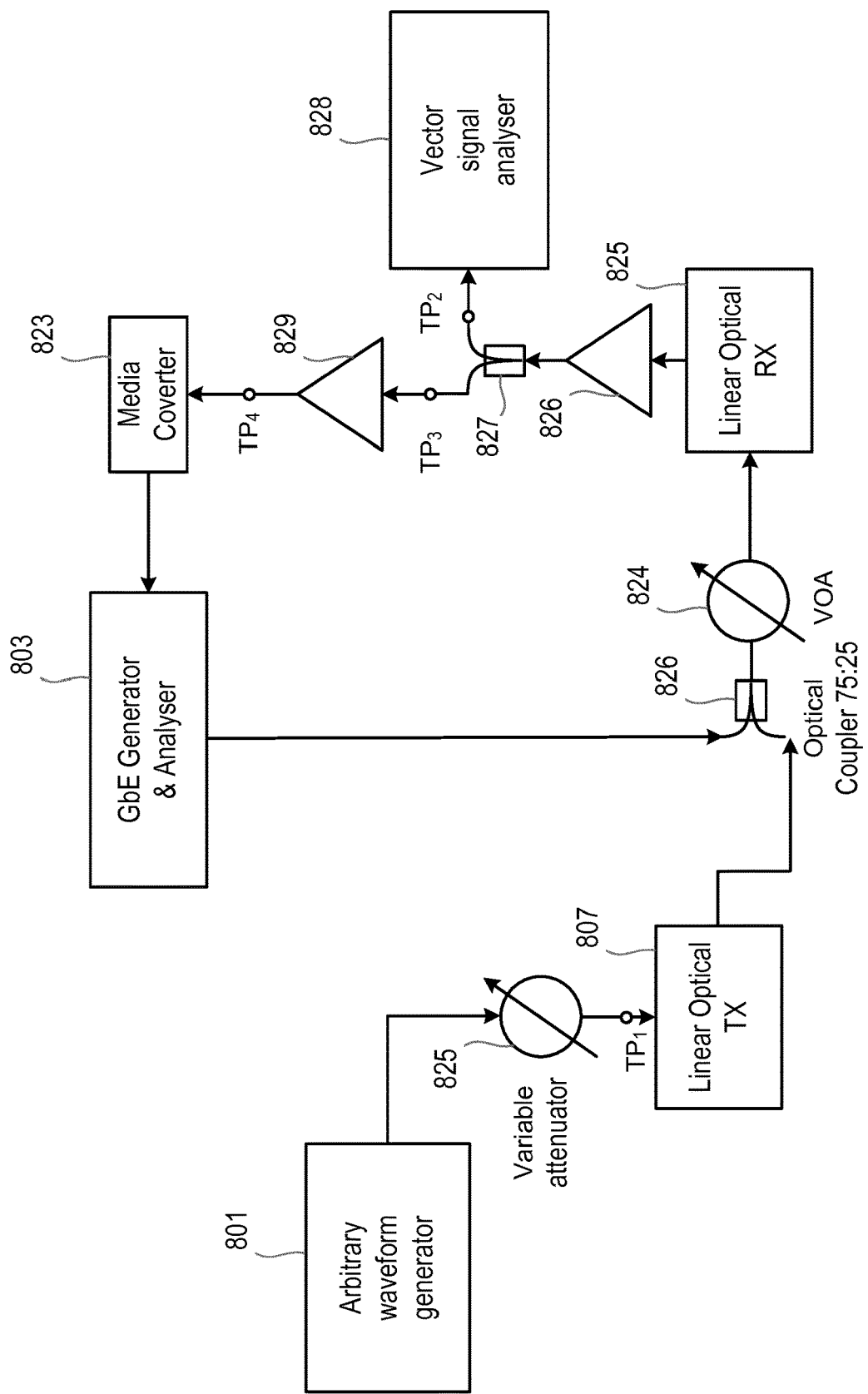
FIG. 8 shows an example of a test arrangement for the example of FIG. 7.

FIG. 8 shows as an example a laboratory test arrangement for testing the arrangement of FIG. 7. The example multiplexes one 64QAM signal with 40 Mbaud at the center of the GbE first notch. In the example of FIG. 8 the test arrangement comprises a power coupling 826 which combines the 64QAM 40 Mbaud signal provided by an arbitrary waveform generator 801 with a digital communication signal provided by a GbE Generator/Analyzer 803. An electrical variable attenuator 825 is used to test system performance with different values of electrical power. A linear optical transmitter 807 is dedicated to the analog signal. Optical power at the receiver side is controlled by a variable optical amplifier (VOA) 824. After photo-detection by a linear optical receiver 825 the combined signal is linear and electrically amplified by a linear amplifier 826, and then demultiplexed by a power divider 827 and conveyed to a vector signal analyzer 828 (e.g. a 3GPP receiver) and to a non-linear amplifier 829 for power adjustment, a media converter 823 for media conversion and the GbE Generator/Analyzer 803 for reception.

Figure 9:
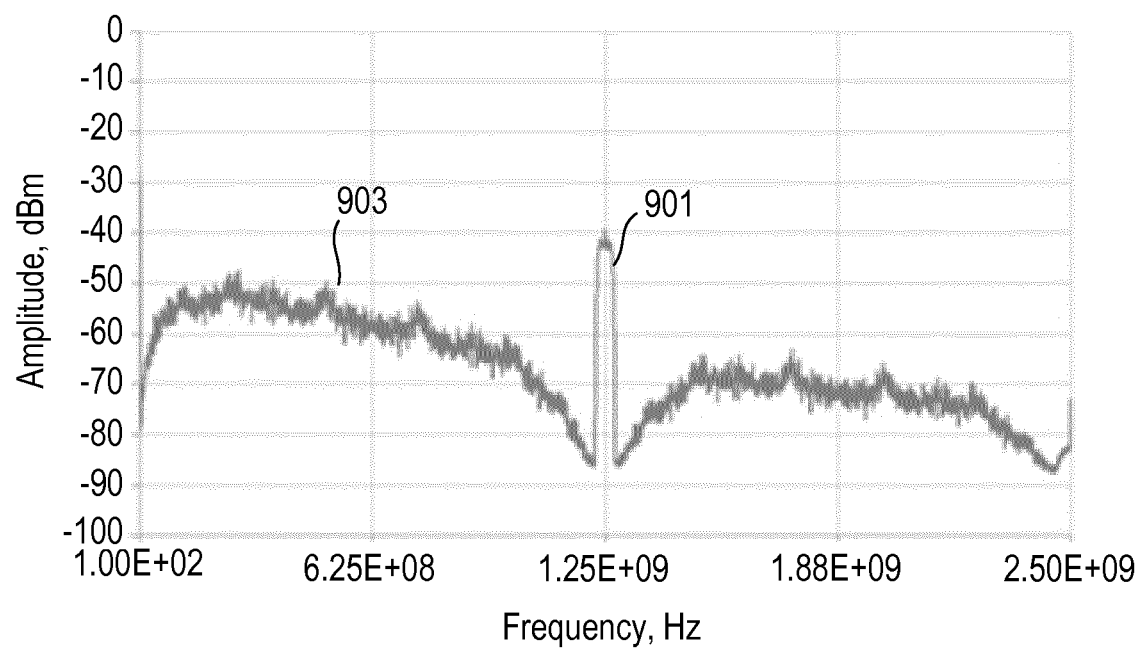
FIG. 9 shows an example of an amplitude versus frequency spectrum showing the results of the test arrangement of FIG. 8.

A portion of the hybrid multiplexed spectrum is shown in FIG. 9, where the multiplexed analog signal 901 is shown in a notch of the digital communication signal 903.

The optical coupling option increases the allowed dynamic range of the 3GPP component, so that they are now very close to that obtained without the GbE signal.

Figure 10:
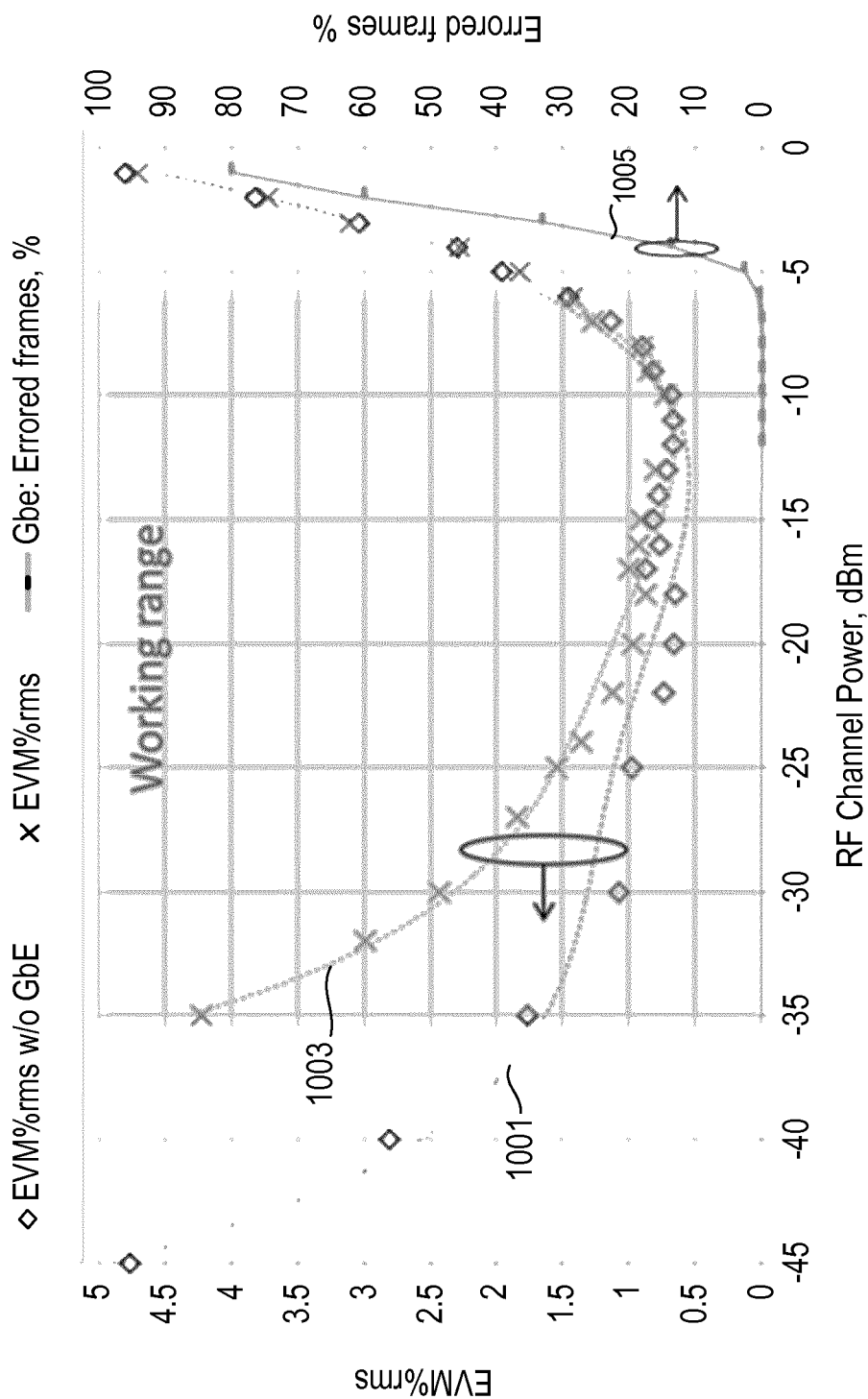
FIG. 10 shows an example of overall performance of the example shown in FIG. 7.

Referring to FIG. 10, there is a wide region corresponding to a RF channel in the range between −35 dBm up to −5 dBm (shown as the shaded working range), where Error-Vector Magnitude (EVM) of the 64QAM signal is more than acceptable (whereby in the example it always stays below 4% rms), and GbE receiver continues to work without errors.

In FIG. 10 the three different curves have been shown: two of them showing the measured EVM % rms of 64QAM signal with and without the GbE signal, labelled 1103 and 1101 respectively; the other curve showing the performance of the GbE receiver by increasing the 64QAM RF power, and labelled 1005.

It is noted that by tuning some optical and electrical parameters the hybrid multiplexing obtained by optical coupling can reduce the influence of the analog signal on the digital one, as it is shown in FIG. 10.

Advantages of hybrid multiplexing described in co-pending application PCT/EP2015/059100 and underlying the embodiments of the present invention that will be described below include the following:

- A common infrastructure (e.g. fiber) is able to operate as a "front haul" for 3GPP signals that requires radio coordination and as a "backhaul" for Ethernet signal, e.g. Wi-Fi;
- More 3GPP signals for multi-carrier support and for high order MIMO (Multiple Input Multiple Output) can be hosted on a single Ethernet stream, using multiple notches of the Ethernet signal;
- An already in place Ethernet infrastructure can be upgraded to carry 3GPP. For example no changes are required in the GbE transceiver, that operates as the 3GPP signals was an additional noise source;
- Laser sources for digital and analog portions of the multiplexed signals, are extremely cheap, because uncooled and low power (e.g. VCSELs);
- A common optical front-end (in case of optical medium) for digital and analog portions of the multiplexed signal.

As seen from the examples described above, co-pending application PCT/EP2015/059100 shows two options to hybrid multiplex one digital signal with one or more analog ones: in the electrical or in the optical domain.

For the examples described in FIGS. 3 to 6 above operating in the electrical domain, some signal degradation can be expected on both the electrical mixer and in the optical transmitter due to the trade-off to perform on a common transmitter the modulation of analog and digital signals, characterized for example by different requirements in terms of linearity, extinction ratio and dynamic range. This issue can be avoided by using two different optical transmitters as shown in the examples described in FIGS. 7 to 10 above, one for the digital signal and one for the analog signal, but this solution has a cost disadvantage due to requiring two laser sources.

The embodiments described below concern the design of an electro-optical transmitter able to process two independent electrical signals, an analog one and a digital one, and then hybrid multiplex them at the output, as described in co-pending application PCT/EP2015/059100, on a single optical wavelength and a common optical fiber (for example by multiplexing one or more analog signals in low power notches of a digital signal).

The embodiments described below are able to overcome the performance limitations of electrical multiplexing, without using an additional optical transmitter.

To realize the hybrid multiplexing the embodiments described below perform the direct modulation of the laser source using the analog signal at the intermediate frequency and the external modulation of the same laser light using the digital one.

Figure 11A:
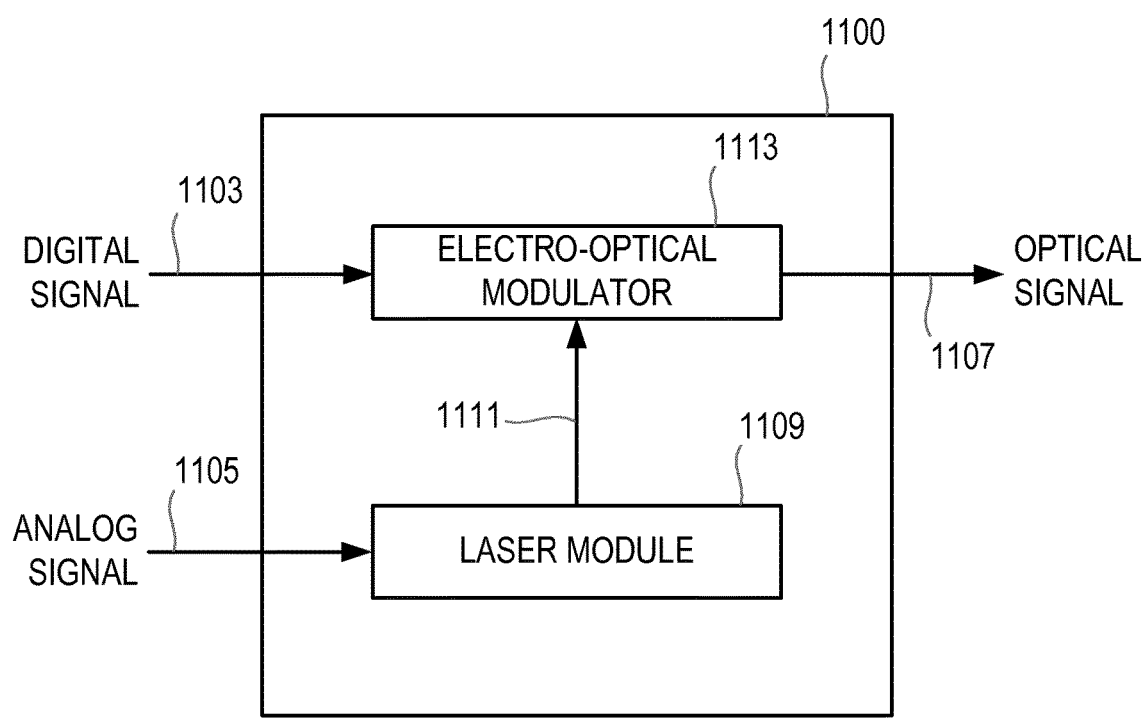
FIG. 11a shows an example of a multiplexing apparatus according to an embodiment.

FIG. 11*a* shows an example of a hybrid multiplexing apparatus 1100 according to a first embodiment, for multiplexing a digital communication signal 1103 from an electrical domain with one or more analog subcarrier communication signals 1105 from the electrical domain into a multiplexed optical signal 1107 for transmission over a common optical communication link.

The hybrid multiplexing apparatus 1100 comprises a laser module 1109 configured to modulate a laser source, with the one or more analog subcarrier communication signals 1105 to be multiplexed, and output an intermediate optical modulated signal 1111.

The hybrid multiplexing apparatus 1100 comprises an electro-optical modulator 1113 coupled to receive the intermediate optical modulated signal 1111 and the digital communication signal 1103 to be multiplexed. The electro-optical modulator 1113 is configured to modulate the intermediate optical modulated signal 1111 with the digital communication signal 1103 to form the multiplexed optical signal.

This has the advantage of allowing a digital communication signal, for example a WiFi communication signal which has been converted into a high speed digital signal, such as a GbE digital signal for digital backhaul, to be combined with one or more analog subcarrier signals, for example analog subcarrier signals relating to analog radio signals of a 3GPP telecommunication network, for example HSPA or LTE networks. The laser source is effectively modulated twice, directly in the laser module 1109 by the one or more analog subcarrier communication signals 1105 to be multiplexed, and by the electro-optical modulator 1113.

In one example the electro-optical modulator 1113 is configured to modulate by superimposing the digital communication signal 1103 onto the intermediate optical modulated signal 1111. Examples of the electro-optical modulator 1113 include a modulator for digital signals, such as an interferometric modulator (e.g. a Mach-Zehender modulator), or an electro-absorption modulator. A Mach-Zehender modulator provides a better performance, for example a better extinction ratio, compared to an electro-absorption modulator, although an electro-absorption modulator can be used in applications where a more cost effective solution is desired. The electro-optical modulator 1113 superimposes the digital signal onto the output of the laser source of the laser module 1109 without needing an additional laser source.

Figure 11B:
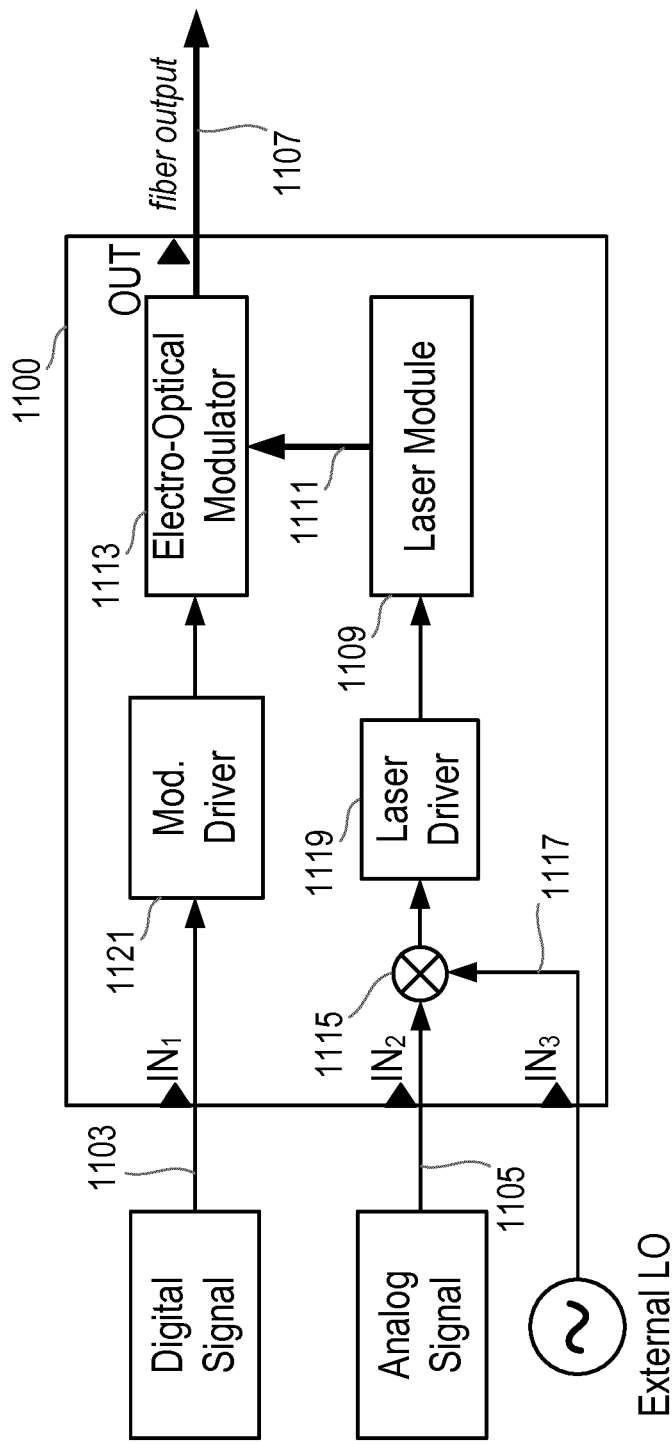
FIG. 11b shows an example of a multiplexing apparatus according to another embodiment.

FIG. 11b shows another example of a more detailed hybrid multiplexing apparatus 1100 according to an embodiment for multiplexing a digital communication signal 1103 from an electrical domain with one or more analog subcarrier communication signals 1105 from the electrical domain into a multiplexed optical signal 1107 for transmission over a common optical communication link.

The hybrid multiplexing apparatus 1100 is effectively functionally split in two main parts: the digital section (upper part) and the analog section (lower part).

The embodiment of FIG. 11b is similar to that of FIG. 11a described above, but further comprises an up-converting module 1115 that is configured to up-convert the one or more analog subcarrier communication signals 1105 prior to modulating the laser source. The up-converting may comprise converting a frequency of the one or more analog subcarrier signals to correspond with the frequency spectrum of one or more low power windows of the digital communication signal 1103.

The up-converting module 1115 may receive a local oscillator signal 1117 for up-converting the one or more analog subcarrier communication signals 1105. In one example the local oscillator signal 1117 may be received from an external local oscillator, although it is noted that the local oscillator could also be provided as part of the hybrid multiplexing apparatus if desired.

In some examples the up-converting module 1115 is configured to select an intermediate frequency used to up convert the analog subcarrier communication signals such that the intermediate frequency matches a periodicity of the low amplitude windows of the digital communication signal 1103.

This provides signals that are weakly superimposed in frequency, which has an advantage of enabling mutual interferences to be reduced.

A laser driver module 1119 is coupled to receive an output from the up-converting module 1115, and configured to output a laser driver signal for driving the laser module 1109.

The hybrid multiplexing apparatus 1100 of FIG. 11b further comprises a modulator driver module 1121 configured to signal condition the digital communication signal 1103 prior to being received by the electro-optical modulator 1113. For example, the modulator driver module 1121 may comprise a broadband non-linear amplifier for amplifying the digital communication signal 1103.

Some embodiments may comprise multiplexing a plurality of analog subcarrier communication signals into each of one or more low amplitude windows (or notches) of the digital communication signal. In some examples different numbers of analog subcarrier communication signals can be multiplexed into different low amplitude windows, for example one analog subcarrier communication signal into one notch, two analog subcarrier communication signals into another notch, and so on in any combination, and any number (depending for example on the width of the narrowband analog subcarrier communication signals, and the width of the low amplitudes windows).

In one embodiment a plurality of analog subcarrier communication signals are multiplexed into each of one or more low amplitude windows of the digital communication signal.

The one or more analog subcarrier communication signals 1105 to be multiplexed into one or more low amplitude windows of the digital communication signal 1103 may be determined according to one or more of the following criteria:

the central frequency and bandwidth of a low amplitude window;
the bandwidth of each analog subcarrier signal;
the total number of analog subcarrier signals;
the required dynamic range and/or noise tolerance of each analog subcarrier signal;
the minimum signal to noise ratio tolerated by a digital receiver coupled to receive the multiplexed signal.

Thus, in the analog section of FIG. 11b, a base band analog communication signal is frequency converted at an intermediate frequency to match one of the notches of the digital signal (low power windows), and then sent to the laser driver 1119, for example a linear laser driver. The laser driver can be configured to amplify the analog signals before being sent to the laser module 1109 for electrical to optical conversion into the intermediate optical modulated signal 1111. A laser source in the laser module 1109 can be selected to provide an improved linear modulation, for example: the highest slope efficiency ([W/A]), lowest RIN, making the power-versus-current curve as linear as possible, and providing the highest relaxation oscillation frequency.

In the digital section of FIG. 11b the digital signal is sent to a modulator driver 1121, which can include for example a broadband non-linear amplifier, and then converted, by an external modulator 1113, in the optical domain.

Taking into account the different requirements of the analog and digital modulation, the laser source may be designed to achieve an optimal linear modulation while the electro-optical external modulator can be designed to achieve an optimal digital modulation. By an external modulator it is meant a modulator that can exist separate to the laser optical module per se.

In the apparatus of FIG. 11b the laser source is directly modulated by the analog signal, and earlier up converted at the intermediate frequency. The modulated light is then sent to an electro-optical modulator where the digital signal is superimposed.

Figure 12:
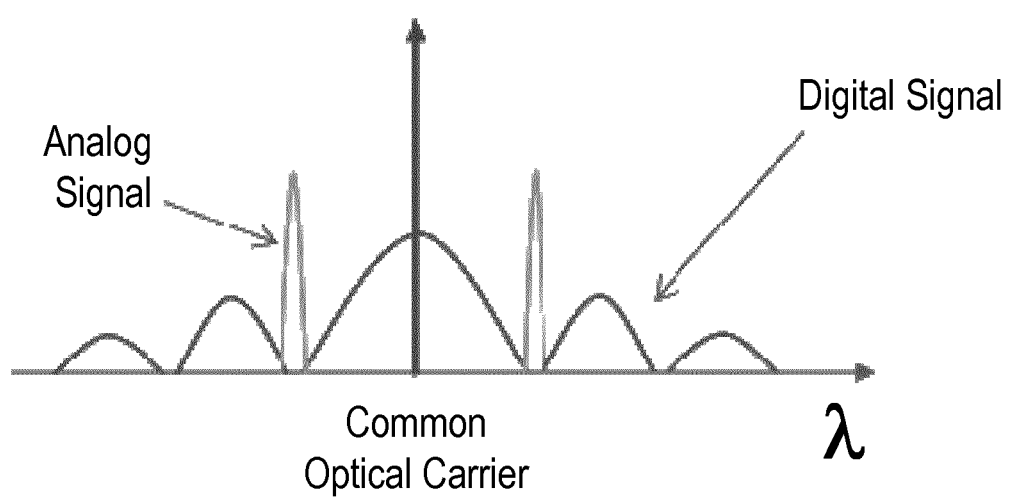
FIG. 12 shows an example of an optical spectrum of an output signal from a multiplexing apparatus.

FIG. 12 shows an example of the superimposition of the two different signals (i.e. digital signal and analog signal) on the same wavelength, as realized as the multiplexed optical signal 1107 of FIGS. 11a and 11b for transmission over an optical communication link, such as an optical fiber. Although the example of FIG. 12 shows an analog subcarrier communication signal being multiplexed into first and second low power windows of a digital signal, as mentioned earlier, any number of analog signals may be multiplexed into one or more low power windows, depending on a particular application.

Figure 13:
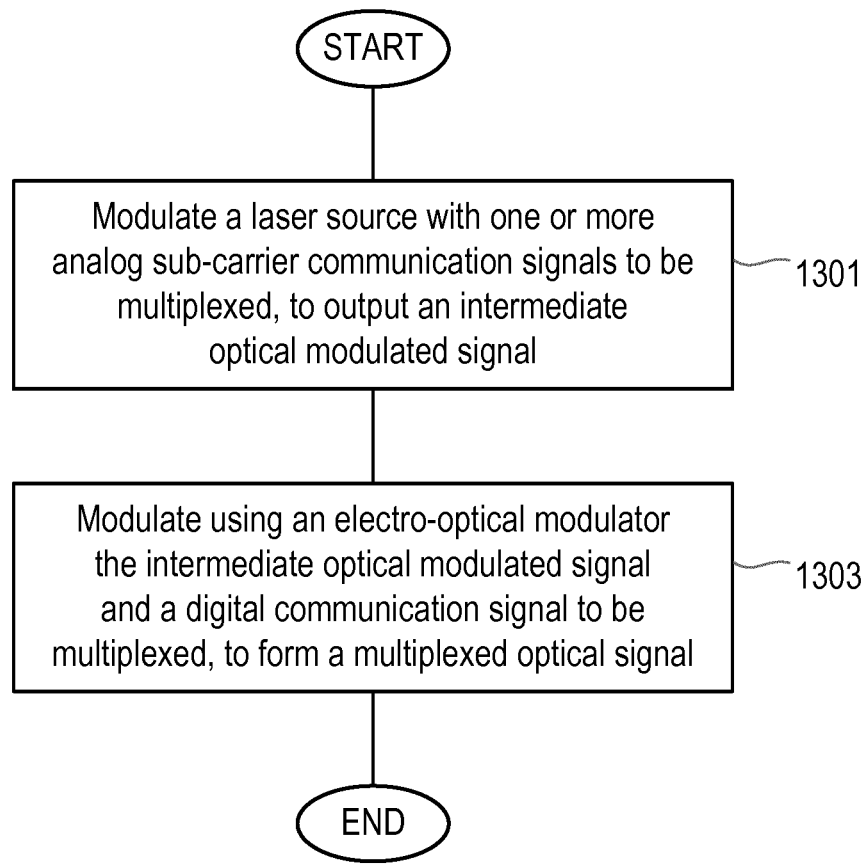
FIG. 13 shows a method according to an embodiment.

FIG. 13 shows a method in a node of a telecommunication network according to an embodiment of the present invention, for multiplexing a digital communication signal from an electrical domain with one or more analog subcarrier communication signals from the electrical domain into a multiplexed optical signal for transmission over a common optical communication link.

The method comprises modulating a laser source with the one or more analog subcarrier communication signals to be multiplexed, to output an intermediate optical modulated signal, step 1301. The method further comprises modulating using an electro-optical modulator the intermediate optical modulated signal and the digital communication signal to be multiplexed, to form the multiplexed optical signal, step 1303.

The step of modulating using an electro-optical modulator may comprise superimposing the digital communication signal onto the intermediate optical modulated signal.

The method may further comprise the steps of up-converting the one or more analog subcarrier communication signals prior to modulating the laser source, wherein the step of up-converting comprises converting a frequency of the one or more analog subcarrier communication signals to correspond with the frequency spectrum of one or more low power windows of the digital communication signal.

The method may comprise multiplexing a plurality of analog subcarrier signals into each of one or more low amplitude windows (or notches) of the digital communication signal. In some examples different numbers of analog signals can be multiplexed into different low amplitude windows, for example one analog subcarrier signal into one notch, two analog subcarrier signals into another notch, and so on in any combination, and any number (depending for example on the width of the narrowband analog signals, and the width of the low amplitudes windows).

In some examples the step of up-converting comprises selecting an intermediate frequency used to up convert the analog subcarrier communication signals such that the intermediate frequency matches a periodicity of the low amplitude windows of the digital communication signal.

This provides signals that are weakly superimposed in frequency, which has an advantage of enabling mutual interferences to be reduced.

The method may further comprise the step of amplifying the digital communication signal prior to being modulated with the intermediate optical modulated signal.

In one embodiment a plurality of analog subcarrier communication signals are multiplexed into each of one or more low amplitude windows of the digital communication signal.

The one or more analog subcarrier communication signals may comprise telecommunication radio signals, or $3^{rd}$ Generation Partnership Project, 3GPP, communication signals. The digital communication signals may comprise local network communication signals, or GigaBit Ethernet, GbE, or WiFi communication signals.

Figure 14:
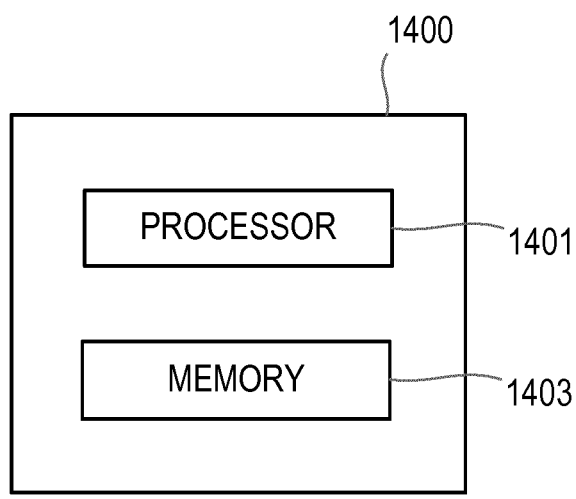
FIG. 14 shows an example of a multiplexing apparatus according to another embodiment.

FIG. 14 illustrates an alternative example of a multiplexer apparatus, which may implement the method of FIG. 13, for example on receipt of suitable instructions from a computer program. It will be appreciated that the units illustrated in FIG. 14 may be realised in any appropriate combination of hardware and/or software. For example, the units may comprise one or more processors and one or more memories containing instructions executable by the one or more processors. The units may be integrated to any degree.

Referring to FIG. 14, there is provided a network node 1400 comprising a processor 1401 and a memory 1403, the memory 1403 containing instructions executable by said processor 1401. In one example the network node 1400 is operative to modulate a laser source with the one or more analog subcarrier communication signals to be multiplexed, to output an intermediate optical modulated signal, and to modulate the intermediate optical modulated signal and the digital communication signal to be multiplexed, to form a multiplexed optical signal.

With a multiplexed optical signal as described in the embodiments above, a transmitted signal may be demultiplexed at a receiver node to separate the digital and analog signals.

Figure 15:
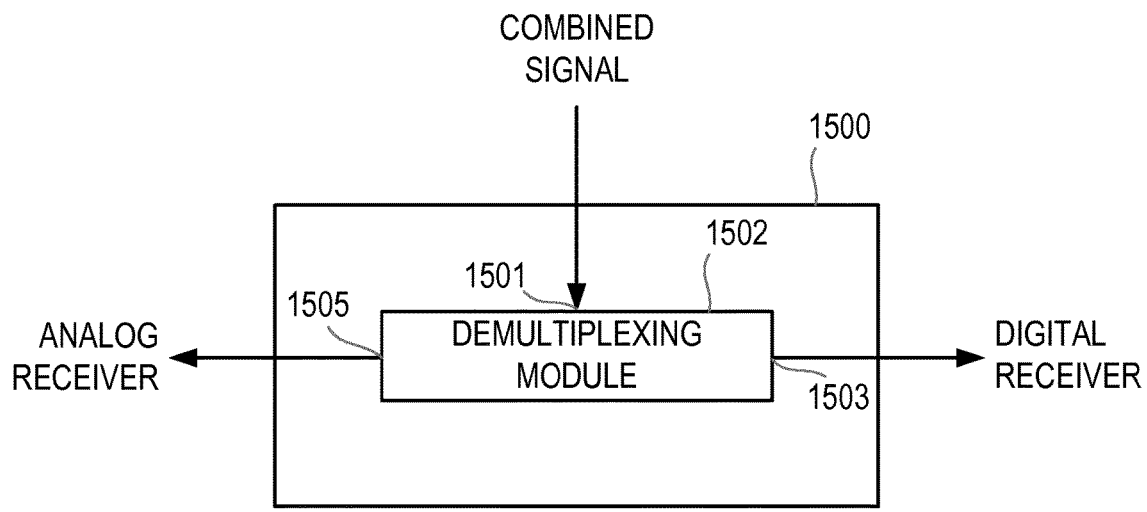
FIG. 15 shows an example of a receiver.

FIG. 15 shows an example of a receiver 1500 as described in co-pending application PCT/EP2015/059100, which may be used for example for demultiplexing an optical signal formed using the apparatus and methods described above. The receiver 1500 comprises a demultiplexing module 1502 comprising an input node 1501 coupled to receive a combined signal comprising a digital communication signal and one or more analog subcarrier signals; a first output node 1503 to output the digital communication signal (e.g. to a digital receiver); and a second output node 1505 to output the one or more analog subcarrier signals (e.g. to an analog receiver). The demultiplexing module 1502 is configured to separate the digital communication signal from the one or more analog subcarrier signals by detecting the one or more analog subcarrier signals within one or more low amplitude windows of the digital communication signal.

Figure 16:
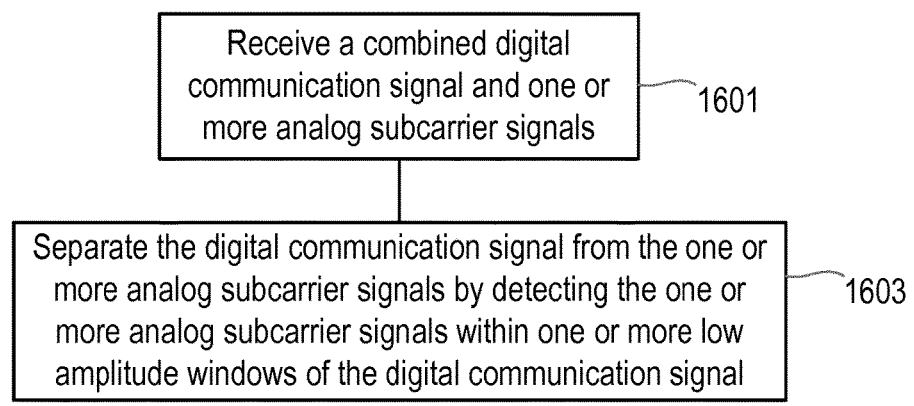
FIG. 16 shows an example of a method in a receiver node.

FIG. 16 shows an example of a method in a receiver node of a telecommunication network. The method comprises receiving a combined signal comprising a digital communication signal and one or more analog subcarrier signals, step 1601. The method comprises separating the digital communication signal from the one or more analog subcarrier signals by detecting the one or more analog subcarrier signals within one or more low amplitude windows of the digital communication signal, step 1603.

The method may comprise, for example, passing the combined signal through a power divider to separate the digital and one or more analog signals.

According to another embodiment, there is provided a computer program, comprising instructions which, when executed on at least one processor, causes the at least one processor to carry out the method according to any one of the embodiments above, and as claimed in the appended claims.

According to another embodiment, there is provided a carrier comprising a computer program as described above, wherein the carrier is one of an electronic signal, optical signal, radio signal or computer readable storage medium.

The embodiments described above provide a method and apparatus to realize an analog/digital multiplexing of compact spectrum analog signals (e.g. radio HSPA/LTE) with a broadband baseband digital signal with notches in the power spectrum (e.g. GbE).

The intermediate frequencies for the compact spectrum signals may be chosen to match the notches in the broadband digital signal spectrum so that the mutual interference can be reduced.

The electrical/optical multiplexing options to realize the transmitter are possible, with a common front-end able to receive both the signals.

The examples described above have the advantage of enabling 3GPP signals to be transported as they are up to a centralized baseband processing site, while on the contrary other network traffic, such as Wi-Fi traffic, can be terminated at the small-cell site and Ethernet backhauled.

The embodiments therefore provide solutions which are able to combine digital Ethernet signals, e.g. generated by Wi-Fi, with analog signals that should be processed at a centralized baseband site, thus taking benefit from interference mitigation and in general from radio coordination.

The embodiments take advantage that digital signals, and in particular Ethernet signals, are much more robust to noise compared with analog ones (e.g. by using line coding) and their performance are unchanged also in case of high level of noise, such as the addition of the 3GPP analog signals.

The embodiments described herein have an advantage of allowing a common infrastructure (for example an optical fiber) to be able to operate as a "front haul" for 3GPP signals that require radio coordination and as a "backhaul" for Ethernet signals, e.g. Wi-Fi.

The embodiments also enable more 3GPP signals for multi-carrier support and for high order MIMO (Multiple Input Multiple Output) to be hosted on a single Ethernet stream, using multiple notches of the Ethernet signal.

The embodiments also have the advantage of enabling an already in place Ethernet infrastructure to be upgraded to carry one or more analog signals, such as 3GPP signals. For example, no changes are required in the GbE transmitter, which operates as if the 3GPP signals are an additional noise source The embodiments also have the advantage that laser sources for digital and analog portions of the multiplexed signals are low cost, because they can be un-cooled and low power (e.g. VCSELs).

Functional blocks, such as that of a Radio Dot System, may also be reused to generate the analog signal intermediate frequency (IF) and for signal processing (e.g. frequency down/up conversion, equalization, Automatic Gain Control (AGC)).

It is noted that the hybrid multiplexing described in the embodiments above may also be extended to any type of media (for example copper in addition to fiber) and with different multiplexing options.

Although the embodiments have been described as a hybrid multiplexing system for GbE signals (generally used to backhaul Wi-Fi and local area networks traffic), it is noted that the embodiments could be extended to any digital signal that presents notches in the power spectrum (e.g. digital baseband signals).

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A hybrid multiplexing apparatus for multiplexing a digital communication signal from an electrical domain with one or more analog subcarrier communication signals from the electrical domain into a multiplexed optical signal for transmission over a common optical communication link, the apparatus comprising:
a laser module configured to modulate a laser source with the one or more analog subcarrier communication signals to be multiplexed, and output an intermediate optical modulated signal;
an electro-optical modulator coupled to receive the intermediate optical modulated signal and the digital communication signal to be multiplexed, and configured to modulate the intermediate optical modulated signal with the digital communication signal to form the multiplexed optical signal; and
a frequency mixer circuit configured to up-convert the one or more analog subcarrier communication signals prior to modulating the laser source, wherein the up-converting comprises converting a frequency of each of the one or more analog subcarrier communication signals to fall within any one of two or more periodic low amplitude windows of the digital communication signal;
wherein the digital communication signal is a broadband signal with a continuous spectrum covering a bandwidth in excess of 1 GHz, the two or more periodic low amplitude windows falling within the bandwidth, and wherein the one or more analog subcarrier communication signals to be multiplexed into the periodic low amplitude windows of the digital communication signal are determined according to a minimum signal to noise ratio tolerated by a digital receiver coupled to receive the multiplexed optical signal.

2. The hybrid multiplexing apparatus of claim 1, wherein the electro-optical modulator is configured to modulate by superimposing the digital communication signal onto the intermediate optical modulated signal.

3. The hybrid multiplexing apparatus of claim 1, wherein the frequency mixer circuit receives a local oscillator signal for up-converting the one or more analog subcarrier communication signals.

4. The hybrid multiplexing apparatus of claim 1, wherein the frequency mixer circuit is configured to select an intermediate frequency used to up convert the one or more analog subcarrier communication signals such that the intermediate frequency matches a periodicity of the periodic low amplitude windows of the digital communication signal.

5. The hybrid multiplexing apparatus of claim 1, further comprising a laser driver module coupled to receive an output from the frequency mixer circuit and configured to output a laser driver signal for driving the laser module.

6. The hybrid multiplexing apparatus of claim 1, further comprising a modulator driver module configured to signal condition the digital communication signal prior to being received by the electro-optical modulator.

7. The hybrid multiplexing apparatus of claim 6, wherein the modulator driver module comprises a broadband non-linear amplifier for amplifying the digital communication signal.

8. The hybrid multiplexing apparatus of claim 1, wherein a plurality of analog subcarrier communication signals are multiplexed into each of the periodic low amplitude windows of the digital communication signal.

9. The hybrid multiplexing apparatus of claim 1, wherein the one or more analog subcarrier communication signals to be multiplexed into the periodic low amplitude windows of the digital communication signal are determined according to one or more of the following criteria:
- the central frequency and bandwidth of a periodic low amplitude window;
- the bandwidth of each analog subcarrier communication signal;
- the total number of analog subcarrier communication signals;
- a required dynamic range and/or noise tolerance of each analog subcarrier communication signal.

10. A method in a node of a telecommunication network, for multiplexing a digital communication signal from an electrical domain with one or more analog subcarrier communication signals from the electrical domain into a multiplexed optical signal for transmission over a common optical communication link, the method comprising:
- modulating a laser source with the one or more analog subcarrier communication signals to be multiplexed, to output an intermediate optical modulated signal;
- modulating using an electro-optical modulator the intermediate optical modulated signal and the digital communication signal to be multiplexed, to form the multiplexed optical signal; and
- up-converting the one or more analog subcarrier communication signals prior to modulating the laser source, wherein the step of up-converting comprises converting a frequency of each of the one or more analog subcarrier communication signals to fall within any one of two or more periodic low amplitude windows of the digital communication signal;
- wherein the digital communication signal is a broadband signal having a continuous spectrum covering a bandwidth in excess of 1 GHz, the two or more periodic low amplitude windows falling within the bandwidth, and wherein the one or more analog subcarrier communication signals to be multiplexed into the periodic low amplitude windows of the digital communication signal are determined according to a minimum signal to noise ratio tolerated by a digital receiver coupled to receive the multiplexed optical signal.

11. The method of claim 10, wherein the step of modulating using an electro-optical modulator comprises superimposing the digital communication signal onto the intermediate optical modulated signal.

12. The method of claim 10, wherein the step of up-converting comprises selecting an intermediate frequency used to up convert the one or more analog subcarrier communication signals such that the intermediate frequency matches a periodicity of the periodic low amplitude windows of the digital communication signal.

13. The method of claim 10, further comprising the step of amplifying the digital communication signal prior to being modulated with the intermediate optical modulated signal.

14. The method of claim 10, wherein a plurality of analog subcarrier communication signals are multiplexed into each of the periodic low amplitude windows of the digital communication signal.

15. The method of claim 10, wherein the one or more analog subcarrier communication signals comprise telecommunication radio signals, or 3rd Generation Partnership Project (3GPP) communication signals, and/or wherein the digital communication signals comprise local network communication signals, or GigaBit Ethernet, GbE, or WiFi communication signals.

16. A non-transitory computer-readable medium comprising, stored thereupon, a computer program comprising instructions that, when executed on at least one processor, causes the at least one processor to carry out the method according to claim 10.

* * * * *